United States Patent Office 3,792,013
Patented Feb. 12, 1974

3,792,013
PALLADIUM-CONTAINING STABILIZERS FOR POLYOLEFINS
Howard E Dunn, Mount Vernon, Ind., and Ronald D. Mathis, Bartlesville, Okla., assignors to Phillips Petroleum Company
No Drawing. Filed Oct. 17, 1969, Ser. No. 867,359
Int. Cl. C08f 45/62
U.S. Cl. 260—45.75 R        6 Claims

ABSTRACT OF THE DISCLOSURE

Stabilizers for incorporation in polymers are disclosed, these stabilizers acting to provide a degree of stability to the polymer against the deteriorating effects of ultraviolet light but which do not significantly affect the whiteness or dyeability of the polymer.

---

This invention relates to the stabilization of polyolefins. In one of its more specific aspects, this invention relates to additives which can be incorporated in polyolefins to stabilize the resulting polyolefin composition against deterioration effects of ultraviolet light.

It is known that polymers and copolymers produced from olefins are limited in their usage because of their tendency to undergo decomposition when exposed for prolonged periods to natural light because of its ultraviolet component. A number of agents can be incorporated in such polymers to stabilize the polymer, that is to increase its resistivity to deterioration in ultraviolet light. However, most of these impart a vivid color to the polymer in which they are incorporated, this color in itself being objectionable since it makes subsequent coloration of the polymer difficult or impossible.

There have now been developed certain stabilizers which when included in the polymers impart to the resulting polymeric composition a high degree of stability against such deterioration and which do not appreciably affect the color or the color receptivity of the polymer.

According to this invention there is provided a polymer stabilizer which comprises a palladium picolinate complex in which the picolinate ligand is either unsubstituted or substituted with organic radicals.

Also, according to this invention there is provided a polymer composition which comprises an olefin polymer produced by the polymerization of olefins having from 2 to about 6 carbon atoms per molecule and a palladium complex as hereinafter defined.

Accordingly, it is an object of this invention to provide improved polymer compositions.

It is also an object of this invention to provide a polymer which is stable and which can be colored as desired.

The polymers in which the stabilizers of this invention can be successfuly incorporated are those olefin polymers produced by the polymerization of one or more olefins having from 2 to about 6 carbon atoms per molecule. These can be homopolymers such as polyethylene or polypropylene or can be copolymers of two or more such olefins. The stabilizers are particularly adaptable for incorporating in a polypropylene resulting from the polymerization of propylene in the particle form process.

The stabilizers are palladium complexes having the following structure:

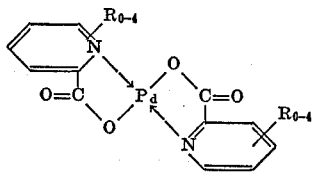

in which R is an alkyl, alkoxy, aryl, or cycloalkyl radical or a combination of these such as an alkaryl or an aralkyl radical, R having from 1 to about 20 carbon atoms, the total number of carbon atoms in the complex being not more than about 62.

Some examples of suitable palladium complexes are represented by the following compounds which can be employed individually or as mixtures with each other:

bis(picolinato)palladium,
bis(3-methylpicolinato)palladium,
bis(4-isobutylpicolinato)palladium,
bis(5-cyclohexylpicolinato)palladium,
bis(4-benzylpicolinato)palladium,
bis(5-o-tollylpicolinato)palladium,
bis[4-(2-ethylhexyl)picolinato]palladium,
bis(3-n-decylpicolinato)palladium,
bis(4-dodecylpicolinato)palladium,
bis(5-eicosylpicolinato)palladium,
bis(4-ethoxypicolinato)palladium.

The palladium complexes can be prepared in any conventional manner. One method, as disclosed in Journal of Chemical Society (London), pages 775–781 (1936), generally involves addition of aqueous picolinic acid to potassium chloropalladite and recovery and purification of the palladium complex precipitated.

These palladium complexes can be incorporated in the polymer over a wide range of concentrations depending upon the nature of the polymer, the degree of exposure of the polymer to ultraviolet light, and the physical characteristics of the specific polymeric product concerned. Generally, the complex will be incorporated in the polymer from about 0.1 to about 5 parts by weight of the complex to 100 parts by weight of the polymer (php.). From about 0.5 to about 2 parts by weight are preferred.

Inclusion of the stabilizing complexes can be independent of, or in addition to, other additives incorporated in the polymer, these other additives being such materials as antioxidants, processing aids, colorants, and the like.

The palladium complex is incorporated in the polymer by any conventional method. Generally the stabilizer, alone or as a mixture with other additives, is dry blended with the particulate polymer, the blend being thereafter subjected to further mixing at temperatures above the melting point of the polymer.

The following examples are indicative of the effect to the stabilizer of this invention.

The stabilizer, bis(picolinato)palladium was blended with polypropylene fluff having a melt flaw of about 3. The stabilizer was incorporated to the extent of about 0.5 php. of the polymer, 0.1 php. of a conventional antioxidant also being included to protect the polymer during the subsequent high temperature incorporation of the stabilizer into the polymer. This antioxidant was Irganox 1093 as manufactured by Geigy Chemical Company, New York, Irganox 1093 being di-n-octadecyl(3,5-di-tert-butyl-4-hydroxybenzyl)phosphonate.

After dry blending the polymer, the stabilizer and the antioxidant, the blend was further mixed at 200° C. for 5 minutes in a nitrogen atmosphere and was then cooled.

The polymeric composition was formed into a 5-mil film from which three specimens were prepared. These were exposed to ultraviolet radiation in a commercial Blacklight-Sunlight exposure device for 20 hours out of every 24 hours, the specimens being tested for failure by flexing through a 180° bend.

Similarly, three strips of film, devoid of the stabilizer of this invention, were similarly prepared and tested. Another three strips of film were also prepared from an identical polymer composition, identically prepared, except that bis(picolinato)nickel was incorporated instead of the stabilizer of this invention. Results were as follows:

Stabilizer: Hours until failure
None _____ 140
bis(Picolinato)nickel _____ 160
bis(Picolinato)palladium _____ 240

The above data indicate the effectiveness of the stabilizer of this invention and the superiority of the polymeric composition of this invention. It further indicates the superiority of the palladium complex of this invention over the nickel complex.

In similar tests of films of the same composition, in which the films were subjected to accelerated exposure at a black panel temperature of 150° F. in an Atlas Weatherometer, the unstabilized film failed at 100 hours whereas the film into which had been incorporated the palladium complex did not fail until after 167 hours.

In another test bis(picolinato)palladium was dry blended in the amount of 1 php. with polypropylene fluff having a melt flow of 15.0 Other additives were also incorporated in the blend, these being 0.07 php. Irganox 1093 and 1.0 php. titatium dioxide pigment.

The blend was pelleted at 425° F., spun and drawn to produce 126 denier yarn (16 denier per filament). These were subjected to accelerated exposure in a commercial Blacklight-Sunlight exposure device, being removed periodically for tensile testing in accordance with ASTM D-2256–64T procedure. For comparative purposes, similar fibers but devoid of the stabilizer of this invention were spun, drawn and similarly exposed and tested. Comparative results, that is, the weight in grams required to break the fiber divided by the denier of the fiber, as compared to this value for the original fiber, were as follows:

| Ultraviolet light exposure, hours | Tenacity retention, percent | |
|---|---|---|
| | Unstabilized fiber | Stabilized fiber |
| 0 | 100 | 100 |
| 100 | 62 | 84 |
| 200 | 26 | 61 |
| 300 | 12 | 37 |

The above data indicate the stabilizing effect of the palladium complexes of the present invention. Interpolation of the above data indicate that the fiber devoid of the palladium complex is reduced to 50 percent retention in 130 hours whereas the fiber containing the palladium complex is only reduced to 50 percent retention after 240 hours.

It will be evident from the above that various modifications can be made to the compositions of this invention. However, such are considered as being within the skill of the art.

What is claimed is:
1. A polymeric composition comprising an olefin polymer produced by the polymerization of olefins having from 2 to about 6 carbon atoms per molecule and a palladium complex having the formula

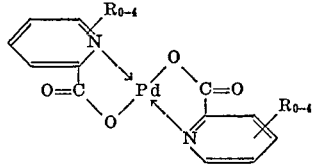

in which R is an alkyl, alkoxy, aryl, cycloalkyl, alkaryl, or aralkyl radical having from 1 to about 20 carbon atoms, said complex having a total number of carbon atoms not in excess of about 62 said complex being present in the composition in an amount effective to increase resistivity of the polymer to deterioration by ultraviolet light.

2. The polymeric composition defined in claim 1 in which said polymer contains an antioxidant.

3. The polymeric composition as defined in claim 1 in which said complex is incorporated in said polymer from about 0.1 to about 5 parts by weight of the complex to 100 parts by weight of the polymer.

4. The polymeric composition as defined in claim 1 in which said complex is incorporated in said polymer by dry blending with the particulate polymer and subjecting the resulting blend to a temperature higher than the melting point of the polymer.

5. The polymeric composition as defined in claim 1 in which said composition has incorporated therein at least an antioxidant, a pigment and a processing aid.

6. The polymeric composition defined in claim 1 in which said polymer contains di-n-octadecyl(3,5-di-tert-butyl-4-hydroxybenzyl)phosphonate.

References Cited
UNITED STATES PATENTS
2,372,588  3/1945  Larsen et al. _____ 260—270
2,809,197  10/1957  Kruse et al. _____ 260—270
3,102,107  8/1963  Soeder _____ 260—45.75
3,367,870  2/1968  Spivack _____ 260—953

DONALD E. CZAJA, Primary Examiner
V. P. HOKE, Assistant Examiner

U.S. Cl. X.R.
260—41 C, 45.75 N, 45.95 D, 270 R